(12) United States Patent
Santra et al.

(10) Patent No.: US 7,642,223 B2
(45) Date of Patent: Jan. 5, 2010

(54) METHODS OF GENERATING A GAS IN A PLUGGING COMPOSITION TO IMPROVE ITS SEALING ABILITY IN A DOWNHOLE PERMEABLE ZONE

(75) Inventors: Ashok K. Santra, Duncan, OK (US); B. Raghava Reddy, Duncan, OK (US); Frank Zamora, San Antonio, TX (US); Giddo Antonio Ocana Gomez, Bogota (CO); Ronnie G. Morgan, Waurika, OK (US); Mark R. Savery, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 352 days.

(21) Appl. No.: 10/967,121

(22) Filed: Oct. 18, 2004

(65) Prior Publication Data

US 2006/0084580 A1    Apr. 20, 2006

(51) Int. Cl.
*E21B 33/13* (2006.01)
(52) U.S. Cl. .................. 507/239; 507/221; 507/225; 507/226; 507/233; 507/235; 507/240; 507/247; 507/248; 507/272; 507/276; 166/281; 166/293; 166/294; 166/295; 166/309
(58) Field of Classification Search ................. None
See application file for complete search history.

(56) References Cited

U.S. PATENT DOCUMENTS

| | | |
|---|---|---|
| 2,649,160 A | 8/1953 | Williams et al. |
| 2,848,051 A | 8/1958 | Williams |

(Continued)

FOREIGN PATENT DOCUMENTS

CN    1364739    8/2001

(Continued)

OTHER PUBLICATIONS

Halliburton brochure entitled "CFR-3™ Cement Friction Reducer Dispersant" dated 2004.

(Continued)

*Primary Examiner*—James Seidleck
*Assistant Examiner*—John J Figueroa
(74) *Attorney, Agent, or Firm*—Craig W. Roddy; Conley Rose, P.C.

(57) ABSTRACT

Methods of servicing a wellbore include generating gas in a plugging composition in situ within a permeable zone in the wellbore, thereby improving the ability of the plugging composition to seal the permeable zone. The gas may be generated via a chemical reaction by, for example, introducing first and second reactants to the plugging composition that can react at ambient temperatures in the wellbore. In an embodiment, the first and second reactants are concurrently pumped into the wellbore via separate flow paths within two concentric conduits to the permeable zone where they are allowed to contact each other in the presence of the plugging composition. In another embodiment, the first reactant, the second reactant, and a retarder for slowing the reaction between the two reactants are concurrently pumped to the permeable zone. In yet another embodiment, one of the reactants is encapsulated to delay a reaction between the two reactants.

44 Claims, 2 Drawing Sheets

U.S. PATENT DOCUMENTS

| | | | |
|---|---|---|---|
| 2,890,752 A | 6/1959 | Crone et al. ............... 166/22 |
| 3,132,693 A | 5/1964 | Weisend ................ 166/33 |
| 3,202,214 A | 8/1965 | McLaughlin |
| 3,215,634 A | 11/1965 | Walker |
| 3,247,171 A | 4/1966 | Walker et al. |
| 3,284,393 A | 11/1966 | Vanderhoff et al. |
| 3,302,717 A | 2/1967 | West et al. |
| 3,306,870 A | 2/1967 | Eilers et al. |
| 3,375,872 A | 4/1968 | McLaughlin et al. |
| 3,376,926 A | 4/1968 | McLaughlin et al. |
| 3,447,608 A | 6/1969 | Fry et al. |
| 3,448,800 A | 6/1969 | Parker et al. |
| 3,464,494 A | 9/1969 | McLaughlin |
| 3,493,529 A | 2/1970 | Krottinger et al. |
| 3,556,221 A | 1/1971 | Haws et al. |
| 3,721,295 A | 3/1973 | Bott |
| 3,724,547 A | 4/1973 | Bott |
| 3,818,998 A | 6/1974 | Hessert |
| 3,893,510 A | 7/1975 | Elphingstone et al. |
| 3,918,523 A | 11/1975 | Stuber |
| 3,953,336 A | 4/1976 | Daigle |
| 3,959,003 A | 5/1976 | Ostroot et al. ............... 106/93 |
| 4,034,809 A | 7/1977 | Phillips et al. |
| 4,083,407 A | 4/1978 | Griffin, Jr. et al. |
| 4,120,361 A | 10/1978 | Threlkeld et al. |
| 4,172,066 A | 10/1979 | Zweigle et al. |
| 4,182,417 A | 1/1980 | McDonald et al. |
| 4,191,254 A | 3/1980 | Baughman et al. |
| 4,202,413 A | 5/1980 | Messenger |
| 4,205,611 A | 6/1980 | Slawinski |
| 4,232,741 A * | 11/1980 | Richardson et al. ......... 166/281 |
| 4,235,291 A | 11/1980 | Messenger |
| 4,248,304 A | 2/1981 | Phillips |
| 4,276,935 A | 7/1981 | Hessert et al. |
| 4,282,928 A | 8/1981 | McDonald et al. |
| 4,299,710 A | 11/1981 | Dupre et al. |
| 4,304,298 A | 12/1981 | Sutton ................ 166/293 |
| 4,340,427 A | 7/1982 | Sutton ................ 106/87 |
| 4,367,093 A | 1/1983 | Burkhalter et al. ............ 106/87 |
| 4,391,925 A | 7/1983 | Mintz et al. |
| 4,450,010 A * | 5/1984 | Burkhalter et al. ......... 106/673 |
| 4,463,808 A | 8/1984 | Mason et al. |
| 4,466,831 A | 8/1984 | Murphey |
| 4,478,640 A | 10/1984 | Holland |
| 4,487,864 A | 12/1984 | Bermudez et al. |
| 4,507,154 A | 3/1985 | Burge et al. |
| 4,515,216 A | 5/1985 | Childs et al. |
| 4,565,578 A | 1/1986 | Sutton et al. ................ 106/87 |
| 4,572,295 A | 2/1986 | Walley |
| 4,579,668 A | 4/1986 | Messenger |
| 4,588,031 A | 5/1986 | Oliver, Jr. et al. |
| 4,635,726 A | 1/1987 | Walker |
| 4,646,834 A | 3/1987 | Bannister |
| 4,664,816 A | 5/1987 | Walker |
| 4,670,501 A | 6/1987 | Dymond et al. |
| 4,690,996 A | 9/1987 | Shih et al. |
| 4,704,213 A | 11/1987 | Delhommer et al. |
| 4,706,755 A | 11/1987 | Roark et al. |
| 4,724,906 A | 2/1988 | Sydansk |
| 4,730,674 A | 3/1988 | Burdge et al. |
| 4,777,200 A | 10/1988 | Dymond et al. |
| 4,818,288 A | 4/1989 | Aignesberger et al. ........ 106/90 |
| 4,836,940 A | 6/1989 | Alexander |
| 4,886,550 A | 12/1989 | Alexander |
| 4,896,724 A * | 1/1990 | Hazlett et al. ............... 166/285 |
| 4,899,819 A * | 2/1990 | Hazlett et al. ............... 166/285 |
| 4,941,533 A | 7/1990 | Buller et al. |
| 4,961,760 A | 10/1990 | Caskey et al. |
| 4,961,790 A | 10/1990 | Smith et al. |
| 4,964,918 A | 10/1990 | Brown et al. |
| 4,989,673 A | 2/1991 | Sydansk |
| 5,002,127 A | 3/1991 | Dalrymple et al. |
| 5,034,139 A | 7/1991 | Reid et al. |
| 5,078,212 A | 1/1992 | Boyle et al. |
| 5,086,841 A | 2/1992 | Reid et al. |
| 5,106,516 A | 4/1992 | Mueller et al. |
| 5,120,367 A | 6/1992 | Smith et al. |
| 5,145,012 A * | 9/1992 | Hutchins et al. ............. 166/292 |
| 5,232,910 A | 8/1993 | Mueller et al. |
| 5,252,554 A | 10/1993 | Mueller et al. |
| 5,318,954 A | 6/1994 | Mueller et al. |
| 5,346,012 A | 9/1994 | Heathman et al. |
| 5,351,759 A | 10/1994 | Nahm et al. |
| 5,385,206 A | 1/1995 | Thomas ................ 166/269 |
| 5,421,410 A * | 6/1995 | Irani ................ 166/294 |
| 5,439,057 A | 8/1995 | Weaver et al. |
| 5,447,197 A | 9/1995 | Rae et al. ................ 166/293 |
| 5,465,792 A | 11/1995 | Dawson et al. |
| 5,476,142 A | 12/1995 | Kajita |
| 5,512,096 A | 4/1996 | Krause |
| 5,547,506 A | 8/1996 | Rae et al. ................ 106/730 |
| 5,550,189 A | 8/1996 | Qin et al. |
| 5,588,488 A | 12/1996 | Vijn et al. |
| 5,591,701 A | 1/1997 | Thomas ................ 507/240 |
| 5,707,443 A | 1/1998 | Brown et al. |
| 5,718,292 A | 2/1998 | Heathman et al. ........... 166/387 |
| 5,735,349 A | 4/1998 | Dawson et al. |
| RE36,066 E | 1/1999 | Mueller et al. |
| 5,881,826 A | 3/1999 | Brookey |
| 5,913,364 A | 6/1999 | Sweatman ................ 166/281 |
| 5,921,319 A | 7/1999 | Curtice ................ 166/279 |
| 6,060,434 A | 5/2000 | Sweatman et al. .......... 507/216 |
| 6,123,159 A | 9/2000 | Brookey et al. |
| 6,148,917 A | 11/2000 | Brookey et al. |
| 6,156,708 A | 12/2000 | Brookey et al. |
| 6,167,967 B1 | 1/2001 | Sweatman ................ 166/281 |
| 6,169,058 B1 | 1/2001 | Le et al. |
| 6,218,343 B1 | 4/2001 | Burts, Jr. |
| 6,258,757 B1 | 7/2001 | Sweatman et al. .......... 507/219 |
| 6,390,208 B1 | 5/2002 | Brookey |
| 6,405,801 B1 | 6/2002 | Vijn et al. ................ 166/293 |
| 6,431,282 B1 | 8/2002 | Bosma et al. |
| 6,457,523 B1 | 10/2002 | Vijn et al. ................ 166/293 |
| 6,460,632 B1 | 10/2002 | Chatterji et al. ................ 175/66 |
| 6,465,397 B1 | 10/2002 | Patterson |
| 6,508,306 B1 | 1/2003 | Reddy et al. ................ 166/295 |
| 6,516,881 B2 | 2/2003 | Hailey, Jr. |
| 6,516,882 B2 | 2/2003 | McGregor et al. |
| 6,518,224 B2 | 2/2003 | Wood |
| 6,554,081 B1 | 4/2003 | Brooks et al. |
| 6,561,269 B1 | 5/2003 | Brown et al. |
| 6,581,701 B2 | 6/2003 | Heying |
| 6,610,140 B2 | 8/2003 | Vijn et al. ................ 166/738 |
| 6,616,753 B2 | 9/2003 | Reddy et al. ................ 106/718 |
| 6,626,992 B2 | 9/2003 | Vijn et al. ................ 106/726 |
| 6,631,766 B2 | 10/2003 | Brothers et al. |
| 6,655,475 B1 | 12/2003 | Wald |
| 6,702,044 B2 | 3/2004 | Reddy et al. ................ 175/64 |
| 6,708,760 B1 | 3/2004 | Chatterji et al. ................ 166/294 |
| 6,715,553 B2 | 4/2004 | Reddy et al. ................ 166/309 |
| 6,716,797 B2 | 4/2004 | Brookey |
| 6,722,433 B2 | 4/2004 | Brothers et al. ............. 166/288 |
| 6,722,434 B2 | 4/2004 | Reddy et al. ................ 166/292 |
| 6,730,636 B2 | 5/2004 | Vijn et al. ................ 507/114 |
| 6,767,867 B2 | 7/2004 | Chatterji et al. |
| 6,770,601 B2 | 8/2004 | Brookey |
| 6,777,377 B2 | 8/2004 | Myers et al. |
| 6,800,593 B2 | 10/2004 | Dobson, Jr. et al. .......... 507/110 |
| 6,858,566 B1 | 2/2005 | Reddy et al. |
| 6,887,832 B2 | 5/2005 | Kirsner et al. |
| 7,156,174 B2 | 1/2007 | Roddy et al. |
| 7,204,312 B2 | 4/2007 | Roddy et al. |
| 2001/0018975 A1 | 9/2001 | Richardson et al. |
| 2002/0040812 A1 | 4/2002 | Heying |

| | | | |
|---|---|---|---|
| 2002/0170717 | A1 | 11/2002 | Venning et al. |
| 2002/0188040 | A1 | 12/2002 | Chen et al. |
| 2003/0008779 | A1 | 1/2003 | Chen et al. |
| 2003/0062170 | A1 | 4/2003 | Slack |
| 2003/0066651 | A1 | 4/2003 | Johnson |
| 2003/0075315 | A1 | 4/2003 | Nguyen et al. |
| 2003/0092582 | A1 | 5/2003 | Reddy et al. |
| 2003/0144153 | A1 | 7/2003 | Kirsner et al. |
| 2003/0181338 | A1 | 9/2003 | Sweatman et al. .......... 507/100 |
| 2003/0186819 | A1 | 10/2003 | Shaarpopur |
| 2003/0201103 | A1 | 10/2003 | Brookey et al. |
| 2004/0069537 | A1 | 4/2004 | Reddy et al. ................... 175/72 |
| 2004/0069538 | A1 | 4/2004 | Reddy et al. ................... 175/72 |
| 2004/0108141 | A1 | 6/2004 | Reddy et al. ................... 175/65 |
| 2004/0168798 | A1 | 9/2004 | Creel et al. |
| 2004/0168801 | A1 | 9/2004 | Reddy et al. ................. 166/292 |
| 2004/0168802 | A1 | 9/2004 | Creel et al. |
| 2004/0168804 | A1* | 9/2004 | Reddy et al. ................. 166/295 |
| 2004/0168830 | A1 | 9/2004 | Reddy et al. ................... 175/65 |
| 2004/0171499 | A1 | 9/2004 | Ravi et al. |
| 2004/0180794 | A1 | 9/2004 | Reddy et al. |
| 2004/0221990 | A1 | 11/2004 | Heathman et al. |
| 2004/0221991 | A1 | 11/2004 | Brothers et al. |
| 2005/0009710 | A1 | 1/2005 | Heathman et al. |
| 2005/0032652 | A1 | 2/2005 | Kirsner et al. |
| 2005/0051363 | A1 | 3/2005 | Munoz, Jr. et al. |
| 2005/0061505 | A1 | 3/2005 | Caveny et al. |
| 2005/0098317 | A1 | 5/2005 | Reddy et al. |
| 2005/0113260 | A1 | 5/2005 | Wood |
| 2005/0113262 | A1 | 5/2005 | Ravi et al. |
| 2005/0124502 | A1 | 6/2005 | Shaarpour |
| 2005/0199401 | A1 | 9/2005 | Patel et al. |
| 2006/0211580 | A1 | 9/2006 | Wang et al. |
| 2006/0213662 | A1 | 9/2006 | Creel et al. |
| 2007/0012447 | A1 | 1/2007 | Fang et al. |

FOREIGN PATENT DOCUMENTS

| | | |
|---|---|---|
| CN | 1348932 | 5/2002 |
| CN | 2003 6 | 6/2003 |
| DE | 217796 | 1/1985 |
| EP | 0530768 A1 | 9/1992 |
| EP | 0 401 936 B1 | 10/1994 |
| EP | 0 566 118 B2 | 10/2001 |
| EP | 1 316 540 A2 | 6/2003 |
| EP | 1 188 726 A2 | 9/2004 |
| GB | 2271350 A | 4/1994 |
| GB | 2325949 A | 12/1998 |
| GB | 2 371 319 A | 7/2002 |
| JP | 53062308 A | 6/1978 |
| JP | 60235863 | 1/1985 |
| JP | 559886 A | 3/1993 |
| JP | 10088508 A | 4/1998 |
| JP | 20000272943 A | 10/2000 |
| JP | 2001048627 A | 2/2001 |
| JP | 2001146457 A | 5/2001 |
| RU | 2160822 C2 | 12/2000 |
| SU | 953187 A | 8/1982 |
| SU | 1723312 | 3/1992 |
| WO | WO 84/01943 | 5/1984 |
| WO | 0174967 A1 | 10/2001 |
| WO | WO 02/084070 A1 | 10/2002 |
| WO | WO 2004/101463 A2 | 11/2004 |
| WO | WO 2004/101463 A3 | 11/2004 |
| WO | WO 2004/101951 A1 | 11/2004 |
| WO | WO 2004/101952 A1 | 11/2004 |

OTHER PUBLICATIONS

Halliburton brochure entitled "Cementing FlexPlug® OBM Lost-Circulation Material" dated 2004.
Halliburton brochure entitled "FlexPlug$^{SM}$ Service Stop Lost Circulation, Hold Your Bottom Line" dated 1998.
Halliburton brochure entitled "Cementing FlexPlug® W Lost-Circulation Material" dated 2004.
Halliburton brochure entitled "HydroChek Service—MOC/One Slurry For Selective Water Control" undated but admitted to be prior art.
Halliburton brochure entitled "MicroBond Expanding Additive for Cement" dated 1999.
Halliburton brochure entitled "Super CBL Additive Cement Additive" dated 1999.
Patent Application entitled "Compositions and Methods for The Delivery of Chemical Components in Subterranean Well Bores" by Craig W. Roddy et al., filed Jan. 30, 2004, U.S. Appl. No. 10/768,323.
Patent Application entitled "Contained Micro-Particles For Use In Well Bore Operations" by Craig W. Roddy et al., filed Jan. 30, 2004, U.S. Appl. No. 10/768,864.
Patent Application entitled "Processes for Incorporating Inert Gas In A Cement Composition Containing Spherical Beads" by B. Raghava Reddy et al., filed Nov. 12, 2003, U.S. Appl. No. 10/706,431.
Patent Application entitled "Methods of Generating Gas In and Foaming Well Cement Compositions" by B Raghava Reddy et al., filed May 31, 2002, U.S. Appl. No. 10/159,001.
Halliburton brochure entitled "FlexPlug Service Stop Lost Circulation, Hold Your Bottom Line" dated 1998.
Halliburton brochure entitled "Flo-Chek® A Additive" dated 1999.
Baroid brochure entitled "Diamond Seal™" dated 1998.
Baroid brochure entitled "HYDRO-PLUG™ Lost Circulation Plug" dated 2002.
Halliburton brochure entitled "Accolade™ Drilling Fluid Exceeds New GOM Environmental Standards And Boosts Performance" dated 2002.
Baroid brochure entitled "ADAPTA™ HPHT Filtration Reducer" dated 2005.
Baroid Fluid Services brochure entitled "AQUAGEL® Viscosifier" dated 2005.
Baroid Fluid Services brochure entitled "BARACARD® Bridging Agent" dated 2005.
Baroid Fluid Services brochure entitled "BARAZAN® D Viscosifier/Suspension Agent" dated 2005.
Baroid Fluid Services brochure entitled "BARAZAN® D Plus Viscosifier/Suspension Agent" dated 2005.
Baroid Fluid Services brochure entitled "CARBONOX® Filtration Control Agent" dated 2005.
Baroid Fluid Services brochure entitled "CLAY GRABBER® Flocculant" dated 2005.
Baroid Fluid Services brochure entitled "CLAYSEAL® Shale Stabilizer" dated 2005.
Baroid brochure entitled "CLAY SYNC™ Shale Stabilizer" dated 2005.
Baroid Fluid Services brochure entitled "COLDTROL®" dated 2005.
Baroid Fluid Services brochure entitled "DURATONE® E Filtration Control Agent" dated 2005.
Baroid Fluid Services brochure entitled "DURATONE® HT Filtration Control Agent" dated 2005.
Baroid Fluid Services brochure entitled "EZ MUL® NT Emulsifier" dated 2005.
Baroid Fluid Services brochure entitled "FILTER-CHEK™ Filtration Control Agent" dated 2005.
Baroid Fluid Services brochure entitled "GELTONE® Viscosifier" dated 2005.
Baroid Fluid Services brochure entitled "GELTONE® II Viscosifier" dated 2005.
Baroid Fluid Services brochure entitled "GELTONE® IV Viscosifer" dated 2005.
Baroid Fluid Services brochure entitled "GELTONE® V Viscosifer" dated 2005.
Baroid brochure entitled "GEM™ 2000 Shale Stabilizer" dated 2005.
Baroid Fluid Services brochure entitled GEM™ CP Shale Stabilizer dated 2005.
Baroid Fluid Services brochure entitled "GEM CP Shale Stabilizer" dated 2005.

Baroid Fluid Services brochure entitled "QUIK-THIN® Thinner" dated 2005.

Baroid Fluid Services brochure entitled "RHEMOD™ L Viscosifer/Suspension Agent" dated 2005.

Baroid Fluid Services brochure entitled "STEELSEAL® Lost Circulation Material" dated 2005.

Baroid Fluid Services brochure entitled "SUSPENTONE™ Suspension Agent" dated 2005.

Baroid Fluid Services brochure entitled "LE™ SUPERMUL Emulsifer" dated 2005.

Kaiser, T.M.V. et al., "Inflow Analysis and Optimization of Slotted Liners," XP-02288463 dated 2002.

Smith, Richard et al., "Coordinated optimization, new well design reduce wellbore stability problems in Valhall field," Oil & Gas Journal, 2004.

"Halliburton's solution to highly reactive clay formation challenges," technology Hydro-Guard, 2003.

"Halliburton's solution to highly reactice clay formation challenges," PetroMin, 2002.

Creel, Prentice et al., "Methods of Using a Swelling Agent in a Wellbore" filed Oct. 21, 2004 as U.S. Appl. No. 10/970,444.

West, Gary W. et al., "Inhibitive Water-Based Drilling Fluid System and Method for Drilling Sands and other Water-Sensitive . . . " filed Apr. 24, 2004 as U.S. Appl. No. 10/831,668.

Office Action dated Jul. 25, 2008 (5 pages), U.S. Appl. No. 10/375,183, filed Feb. 27, 2003.

Baroid Fluid Services brochure entitled "GEM(TM) GP Shale Stabilizer," Apr. 2005, 2 pages, Halliburton.

Derwent Abstract No. 1983-704150, abstract of Soviet Union Patent Publication No. SU 953187 published on Aug. 23, 1982.

Derwent Abstract No. 1992-072444, abstract of South Africa Patent Publication No. ZA 9100876A published on Dec. 24, 1991.

Derwent Abstract No. 1998-519099, abstract of Russian Patent Publication No. 2107158 C1 published on Mar. 20, 1998, Abstract Only.

Derwent Abstract No. 2001-180538, abstract of Russian Patent Publication No. 2160822 C2 published on Dec. 20, 2000, Abstract Only.

Derwent Abstract No. 2002-525993, abstract of Russian Patent Publication No. 2183264 C2 published on Jun. 10, 2002, Abstract Only.

Foreign Communication from a related counterpart application—International Search Report, PCT/GB 03/05537, Apr. 16, 2004, 6 pages.

Foreign Communication from a related counterpart application—International Search Report and Written Opinion, PCT/GB2004/000671, Jul. 12, 2004, 6 pages.

Foreign Communication from a related counterpart application—International Search Report and Written Opinion, PCT/GB2004/001646, Jul. 27, 2004, 7 pages.

Foreign Communication from a related counterpart application—International Search Report and Written Opinion, PCT/GB2006/002659, Oct. 12, 2006, 11 pages.

Foreign Communication from a related counterpart application—International Search Report and Opinion, PCT/GB2004/000411, Jun. 16, 2004, 6 pages.

Halliburton brochure entitled "FlexPlug® Service: Helps Operator Solve Lost Circulation Problems Quickly and Effectively," 1998, 3 pages, Halliburton Energy Services, Inc.

Office Action dated Dec. 22, 2003 (9 pages), U.S. Appl. No. 10/375,183, filed Feb. 27, 2003.

Office Action dated Nov. 17, 2004 (16 pages), U.S. Appl. No. 10/375,183, filed Feb. 27, 2003.

Office Action dated Apr. 19, 2005 (11 pages), U.S. Appl. No. 10/375,183, filed Feb. 27, 2003.

Office Action (Final) dated Aug. 29, 2005 (22 pages), U.S. Appl. No. 10/375,183, filed Feb. 27, 2003.

Office Action dated Aug. 29, 2007 (36 pages), U.S. Appl. No. 10/375,183, filed Feb. 27, 2003.

Office Action (Final) dated Jan. 14, 2008 (7 pages), U.S. Appl. No. 10/375,183, filed Feb. 27, 2003.

Office Action dated Mar. 17, 2004 (9 pages), U.S. Appl. No. 10/375,205, filed Feb. 27, 2003.

Office Action dated Jul. 29, 2004 (8 pages), U.S. Appl. No. 10/375,206, filed Feb. 27, 2003.

Office Action dated Jan. 31, 2005 (14 pages), U.S. Appl. No. 10/375,206, filed Feb. 27, 2003.

Office Action dated Feb. 12, 2008 (6 pages), U.S. Appl. No. 10/970,444, filed Oct. 21, 2004.

Office Action dated Apr. 11, 2007 (24 pages), U.S. Appl. No. 11/090,496, filed Mar. 25, 2005.

Office Action dated Oct. 18, 2007 (6 pages), U.S. Appl. No. 11/090,496, filed Mar. 25, 2005.

Office Action dated Jan. 26, 2007 (24 pages), U.S. Appl. No. 11/180,767, filed Jul. 13, 2005.

Office Action dated Aug. 23, 2007 (6 pages), U.S. Appl. No. 11/180,767, filed Jul. 13, 2005.

Office Action dated May 13, 2008 (8 pages), U.S. Appl. No. 11/180,767, filed Jul. 13, 2005.

Office Action dated May 14, 2008 (11 pages), U.S. Appl. No. 11/090,496, filed Mar. 25, 2005.

Translation of Russian Patent Publication No. RU 2107158 C1 published on Mar. 20, 1998.

Translation of Russian Patent Publication No. RU 2160822 C2 published on Dec. 20, 2002.

Translation of Russian Patent Publication No. RU 2183264 C2 published on Jun. 10, 2002.

Office Action dated Nov. 24, 2008 (11 pages), U.S. Appl. No. 11/090,496, filed Mar. 25, 2005.

Office Action dated Dec. 5, 2008 (7 pages), U.S. Appl. No. 10/375,183, filed Feb. 27, 2003.

Office Action dated Jan. 8, 2009 (18 pages), U.S. Appl. No. 10/970,444, filed Oct. 21, 2004.

Office Action dated Apr. 10, 2009 (14 pages), U.S. Appl. No. 11/180,767, filed Jul. 13, 2005.

Office Action dated Apr. 15, 2009 (12 pages), U.S. Appl. No. 10/970,444, filed Oct. 21, 2004.

Office Action dated Jun. 9, 2009 (10 pages), U.S. Appl. No. 11/090,496, filed Mar. 25, 2005.

Derwent Abstract No. 2001-180538, abstract of Russian Patent Publication No. 2160822 C2, 2009, 2 pages, Derwent Information Ltd.

Foreign communication from a related counterpart application—International Search Report and Written Opinion, PCT/EP2004/005479, Sep. 30, 2004, 8 pages.

Foreign communication from a related counterpart application—International Preliminary Report on Patentability, PCT/EP2004/005479, Aug. 30, 2005, 7 pages.

Office Action dated Jul. 16, 2009 (19 pages), U.S. Appl. No. 10/375,183, filed Feb. 27, 2003.

\* cited by examiner

METHODS OF GENERATING A GAS IN A PLUGGING COMPOSITION TO IMPROVE ITS SEALING ABILITY IN A DOWNHOLE PERMEABLE ZONE

FIELD OF THE INVENTION

The present invention generally relates to recovering materials from a subterranean formation, and more particularly to methods of generating a gas in a plugging composition in situ within a downhole permeable zone such as a formation fracture, thereby improving the ability of the plugging composition to seal the permeable zone.

BACKGROUND OF THE INVENTION

A natural resource such as oil or gas residing in a subterranean formation can be recovered by drilling a well into the formation. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Further drilling into the subterranean formation followed by cementing is continued until the production zone containing the natural resource such as oil or gas is reached. The purpose of cementing different subterranean zones prior to reaching the production zone is to isolate the flow of fluids from the cemented zones into the wellbore. Frequently this process is referred to as zonal isolation. Subsequent secondary cementing operations, i.e., any cementing operation after the primary cementing operation, may also be performed. One example of a secondary cementing operation is squeeze cementing whereby a cement slurry is forced under pressure to areas of lost integrity in the annulus to seal off those areas.

As a wellbore is being prepared to provide for the recovery of oil or gas residing in the subterranean formation, permeable zones through which fluid can undesirably migrate often need to be plugged. For example, fractures previously created in the formation to increase the production of the oil or gas may eventually produce water rather than oil or gas. To provide for the production of more oil or gas, a fracturing fluid may again be pumped into the formation to form additional fractures therein. However, the previously used fractures first must be plugged to prevent the loss of the fracturing fluid into the formation via those fractures. Thus, plugging compositions are also useful in stimulation of new production zones after the prevailing production zone stimulated via perforations through the casing has become depleted. In such cases the existing perforations need to be plugged so that the fracturing fluid can be diverted to new perforations in a new zone.

In addition to the fracturing fluid, other fluids used in servicing a wellbore may also be lost to the subterranean formation while circulating the fluids in the wellbore. In particular, the fluids may enter the subterranean formation via permeable zones such as depleted zones, zones of relatively low pressure, lost circulation zones having naturally occurring fractures, weak zones having fracture gradients exceeded by the hydrostatic pressure of the servicing fluid, and so forth. As a result, the service provided by such fluid is more difficult to achieve. For example, a drilling fluid could be lost to the formation, resulting in the circulation of the fluid in the wellbore being too low to allow for further drilling of the wellbore. Also, a cement/sealant composition could be lost to the formation as it is being placed in the wellbore, thereby rendering the cementing/sealing operation ineffective in maintaining isolation of the formation. The loss of such fluids increases the cost of the overall operation due to the prolonged rig time required, the fluids being relatively expensive, and possibly a need to install casing. The plugging of such permeable zones in the formation with plugging compositions is thus needed to avoid such problems.

Permeable zones in the subterranean formation may further allow water to undesirably flow from the formation into the wellbore during primary and secondary cementing operations, resulting in the influx and crossflows of water through cement slurries that have been placed in the wellbore. The influx of water may occur during a transition phase in which a cement slurry changes from a true hydraulic fluid to a highly viscous mass showing some solid characteristics. Consequently, flow channels may remain in the cement slurry after it has completely set. Those flow channels could allow the water to flow from one subterranean zone to another such that zonal isolation is no longer achieved. Further, the water can intermix with and dilute the cement slurry, causing deterioration of the cement properties such as its density, its final compressive strength, and its rheology. As such, the permeable zones in the formation need to be plugged to prevent the in flux and crossflows of water through the cement slurry before it sets.

The isolation of the subterranean formation also may be compromised by permeable zones present in the annulus and/or the wall of the casing in the wellbore. Permeable zones such as voids in the cement column placed in the annulus may result from an incomplete fill in of the annulus during primary cementing. Permeable zones may also be caused by the expansion and contraction of the casing and the cement column due to cyclical changes in underground pressures and temperatures during the life of the well. Moreover, the cement column may experience impacts and shocks generated by subsequent drilling, pressure testing, hydraulic fracturing, or other well operations. Unfortunately, conventional cement suffers from the drawback of being brittle and fragile and thus often cannot sustain such stress. Consequently, cracks or voids may form in the cement column and/or the casing wall. Further, microannuli may form between the cement column and the casing and between the cement column and the subterranean formation. The microannuli, the voids or cracks in the cement column, and/or the voids or cracks in the casing wall need to be plugged to ensure that the subterranean formation remains isolated from other subterranean formations.

A variety of compositions have been developed for plugging the permeable zones described above, and such compositions may form a sealing mass having a relatively high viscosity, for example, when contacting water in the wellbore or when two fluids are allowed to contact with each other near the zone requiring plugging. The use of such plugging compositions, however, does not necessarily ensure that fluid will be prevented from flowing through the permeable zones in which they are placed. The plugging compositions may be unable to withstand the pressures applied by the fluids in the wellbore or the formation fluids due to, for example, an insufficient amount of friction between the compositions and adjacent surfaces in the wellbore. When subjected to such pressures, the plugging compositions thus may be dislodged from their positions in the permeable zones. Further, the plugging compositions may lack the the ability to resiliently conform to the changes in the sizes and shapes of the permeable zones that often occur during the follow up operations in the wellbore in which they are used. Therefore, fluid may undesirably leak through areas of the permeable zones where the plugging compositions have debonded from the perimeters of those zones. Accordingly, a need exists to develop methods for improving the ability of plugging compositions to effectively seal permeable zones.

SUMMARY OF THE INVENTION

Methods of servicing a wellbore include generating a gas in a plugging composition in situ within a permeable zone in the wellbore, thereby improving the ability of the plugging composition to seal the permeable zone. The gas may be generated via a chemical reaction by, for example, introducing first and second reactants to the plugging composition that can react at ambient temperatures in the wellbore to produce the gas. In an embodiment, the first reactant comprises a nitrogen-generating material, and the second reactant comprises an alkaline aqueous solution or an oxidizing agent. In another embodiment, the first reactant comprises a hydrogen generating material, and the second reactant comprises an alkaline aqueous solution. In yet another embodiment, the first reactant comprises a carbon dioxide generating chemical and the second reactant comprises an acid or acid generating chemical.

In an embodiment, the first and second reactants are concurrently pumped into the wellbore via separate flow paths, for example within two concentric conduits, to the permeable zone where they are allowed to contact each other in the presence of the plugging composition. In another embodiment, the first reactant, the second reactant, and a retarder for slowing the reaction between the two reactants are concurrently pumped to the permeable zone. In yet another embodiment, the first and second reactants are concurrently pumped to the permeable zone, and one of the reactants is encapsulated to delay a reaction between the two reactants.

DETAILED DESCRIPTION OF THE PREFERRED EMBODIMENTS

A gas may be generated in a plugging composition in situ within a permeable zone in a wellbore to improve the resiliency of the plugging composition, to increase its friction relative to adjacent surfaces, and to fill voids of different dimensions. Thus, the plugging composition is pumped down the wellbore, which penetrates a subterranean formation, and into at least one permeable zone where it is allowed to viscosify and form a mass through which very little or no fluid can migrate. While in some embodiments a portion of the gas may be generated before reaching the permeable zone, a majority of the gas is still generated in the permeable zone during or after the viscosification of the plugging composition. In alternative embodiments, greater than 50%, 75%, 90%, 95%, or 99% of the gas based on the total volume of gas is generated in the permeable zone. The amount of gas generated in the plugging composition may be sufficient to cause the composition to expand in size and completely fill a cross-section of the permeable zone. As a result, the perimeter of the plugging composition abuts the perimeter of the permeable zone such that the zone is sealed against fluid from flowing therethrough.

As used herein, a permeable zone in the wellbore refers to an area in the wellbore or the subterranean formation adjacent to the wellbore through which fluid can undesirably migrate. It is understood that "subterranean formation" encompasses both areas below exposed earth or areas below earth covered by water such as sea or ocean water. Such permeable zones may be present in, for example, the subterranean formation, the wall of a conduit disposed in the wellbore such as a casing, a sealant/cement column disposed in an annulus of the wellbore between the casing and a subterranean formation penetrated by the wellbore, a microannulus interposed between the casing and the sealant/cement column, a microannulus interposed between the sealant/cement column and the formation, or combinations thereof. Examples of such permeable zones include a fissure, a crack, a fracture, a vug, a streak, a flow channel, a void, a perforation formed by a perforating gun, or combinations thereof. In an embodiment, the permeable zone is a loss circulation zone such as a fracture through which fluids being circulated in the wellbore can undesirably pass into the subterranean formation. In another embodiment, the permeable zone allows a formation fluid such as water to pass into the wellbore and thus form crossflows in fluids residing therein such as a cement slurry before it sets. In yet another embodiment, the permeable zone compromises the isolation of the subterranean formation by allowing the flow of fluid through areas previously sealed against such flow such as through a sealant/cement column.

In one embodiment, the gas may be generated in the plugging composition by combining a compressed liquefied gas with the plugging composition before displacing it to the permeable zone. The pressure being applied to the liquefied gas may be reduced and/or the temperature may be increased by an amount effective to change the liquefied gas from the liquid phase back into the gas phase when the plugging composition is in the permeable zone. The liquefied gas may be, for example, compressed carbon dioxide ($CO_2$). Alternately, the downhole temperature and pressure may be sufficient to convert the liquefied gas from liquid to the gaseous form at the same surface pressure. Thus, for example carbon dioxide exists as a gas above 31° C. or 86° F. (called critical temperature). Above this temperature it is invariably in gaseous form at or below 73 atm or 1073 psi (called critical pressure). When the temperature exceeds the critical temperature, for example in the permeable zone, the gaseous form exists in equilibrium with either liquid or solid form depending on the pressure. Other liquefied gases suitable with suitable critical temperatures and pressures include liquefied hydrocarbons such as liquefied hydrocarbon gases such as propane and butane. The amount of liquefied gas is in the range of 0.1% to 30% by volume of the plugging composition under downhole conditions, and preferably in the 0.5% to 5% by volume of the plugging composition. It is understood that the gas generated in the plugging composition should not react with the plugging composition thus interfering detrimentally with the effectiveness of the plugging composition. For example, carbon dioxide cannot be used when the plugging composition comprises Portland cement, an alkaline chemical.

In another embodiment, the generation of the gas in the plugging composition may be delayed until it is placed in the downhole permeable zone by using a chemical reaction to generate the gas. That is, a gas generating material (i.e., the first reactant) and a material capable of reacting with the gas generating material to produce a gas (i.e., the second reactant, also known as the activator) at ambient temperatures and pressures may be contacted in the wellbore in the presence of the plugging composition in situ in the permeable zone.

In one embodiment, the first reactant is a nitrogen ($N_2$) generating material. Examples of suitable nitrogen generating materials include, but are not limited to, compounds containing hydrazine or azo groups such as hydrazine, a hydrazine salt of an acid, azodicarbonamide, azobis (isobutyronitrile), p-toluene sulfonyl hydrazide, p-toluene sulfonyl semicarbazide, carbohydrazide, p-p'-oxybis(benzenesulfonylhydrazide), and combinations thereof. Examples of nitrogen generating materials that do not contain hydrazine or azo groups include, but are not limited to, an ammonium salt of an organic or inorganic acid, hydroxylamine sulfate, carbamide, and combinations thereof. Of these, azodicarbonamide and carbohydrazide are preferred. The amount of the nitrogen gas generating chemical is in a range of from about 0.1 to about 5% by weight of the plugging composition.

The second reactant used in conjunction with a particular nitrogen generating material may be selected based on the structure of that material. When the nitrogen generating material includes an azo group containing two nitrogens connected by a double bond as in azodicarbonamide, the second reactant may be an alkaline aqueous solution. The alkaline aqueous solution may include water and a sufficient amount of an alkaline material to have a pH in the range of from about 7 to about 14, alternatively from about 10 to about 14. The reaction with azodicarbonamide generates predominantly nitrogen gas with ammonia and oxides of carbon as the minor byproducts. It is believed without being limited by theory that the reaction of an alkaline material with the azo compound releases diimide dianion which being unstable decomposes to nitrogen gas. Examples of suitable alkaline materials include, but are not limited to, carbonate, phosphate, hydroxide, and oxide salts of alkali and alkaline earth metals such as lithium, sodium, magnesium, and calcium, hydraulic cements, and combinations thereof. In an embodiment the alkaline solution may be a cement slurry. In an embodiment, the activator, e.g., alkaline aqueous solution, may be added to the plugging composition in an amount effective to react with the gas generating compound and produce a desired amount of gas. In another embodiment, the alkaline aqueous solution may be added to the plugging composition in amounts such that the plugging composition has a pH in the range of from about 7 to about 14, alternatively from about 10 to about 14, alternatively from about 12 to about 13.

When the nitrogen generating material includes hydrazide groups in which the two nitrogen atoms are connected by a single bond and to one or two hydrogens, the second reactant may be an oxidizing agent. It is believed that the oxidizing agent oxidizes the hydrazide group to an azo structure. To enhance the water solubility and/or reactivity of the nitrogen generating material, an alkaline pH is typically required. Thus, the oxidizing agent may be combined with an alkaline aqueous solution like that described above. Examples of suitable oxidizing agents include, but are not limited to, alkaline and alkaline earth metal salts of peroxide, persulfate, perborate, hypochlorite, hypobromite, chlorite, chlorate, iodate, bromate, chloroaurate, arsenate, antimonite and molybate anions, and combinations thereof. Specific examples of the oxidizing agents include ammonium persulfate, sodium persulfate, potassium persulfate, sodium chlorite, sodium chlorate, hydrogen peroxide, sodium perborate, and sodium peroxy carbonate. The amount of the oxidizing agent in the plugging composition is in the range of 0.8 to about 3 times the molar amount of the gas generating material, preferably 1.2 to 2.2 times the molar amount of the gas generating material.

Another gas generating chemical system comprises two reactants, one of which is a carbon dioxide generating material and the second is an activator comprising one or more acids or acid generating materials. Suitable carbon dioxide generating materials include ammonium, alkali metal, alkaline earth metal and transition metal salts of carbonate and bicarbonate or combinations thereof. In general, any material capable of lowering the pH of an aqueous solution below 6 may be a suitable activator, including organic or inorganic material. Suitable organic materials include acetic acid, citric acid, tartaric acid and the like. Suitable inorganic materials include alkali, alkaline earth and transition metal salts of dihydrogen phosphate, acid pyrophosphate and the like. The amounts of materials used are sufficient to generate 0.5% to 30% gas by volume of the plugging mass under downhole conditions and are calculated based on the equations provided below as well as the ideal gas equation:

$$[CO_3]^{2-} + 2H^+ \rightarrow CO_2(gas) + H_2O \quad \text{(Equation 1)}$$

$$[HCO_3]^{2-} + H^+ \rightarrow CO_2(gas) + H_2O \quad \text{(Equation 2)}$$

$$PV = nRT \quad \text{(Equation 3)}$$

where P=downhole pressure, V=volume of gas, R=universal gas constant, T=downhole temperature in Kelvin degrees, and n=number of moles of gas.

In another embodiment, the first reactant is a hydrogen generating material. Examples of suitable hydrogen generating materials include, but are not limited to, aluminum, calcium, zinc, magnesium, lithium, sodium, potassium, or mixtures thereof. In an embodiment, the hydrogen generating material is an aluminum powder such as GAS CHECK powder commercially available from Halliburton Energy Services, Inc. The amount of the hydrogen gas generating chemical is in a range of from about 0 to about 5% by volume of the plugging composition under downhole conditions, alternatively from about 0.1 to about 3%, alternatively from about 0.2 to 2%.

In an embodiment in which the hydrogen generating material comprises an aluminum powder, the powder may be treated with a retarder for slowing the reaction rate of the aluminum power with the alkaline aqueous solution. Examples of suitable retarders include but are not limited to fatty acid esters of sorbitan, glycerol, and/or pentaerythritol. Specific examples of suitable fatty acid esters include sorbitan monoooleate, sorbitan monoricinoleate, sorbitan monotallate, sorbitan monoisostearate, sorbitan monostearate, glycerol monoricinoleate, glycerol monostearate, pentaerythritol monoricinoleate, and combinations thereof. An example of a suitable retarder is GAS CHECK INHIBITOR available from Halliburton Energy Services, Inc. An effective quantity of at least one of the esters may be dissolved in an organic solvent. The resulting retarder solution may then be combined with a quantity of aluminum powder whereby the aluminum powder is wetted with the solution. The solvent may then be evaporated and removed under vacuum, followed by drying the aluminum powder under vacuum. Examples of suitable organic solvents include but are not limited to methyl alcohol, ethyl alcohol, isopropyl alcohol, medium boiling petroleum distillates, petroleum ether, and combinations thereof. Alternatively, the retarder may be added directly to the composition containing aluminum powder.

The amount of retarder used with the aluminum powder may depend on the surface area of the powder and the extent of retardation desired. In embodiments, the amount of retarder present in the retarder solution may be in a range of from about 1.0% to about 5% by weight of the aluminum powder or in a range of from about 0.05% to about 15% by weight of the total fluid. The amount of retarder solution combined with the aluminum powder varies with the fineness and surface area of the powder. In an embodiment, the amount of retarder solution may be in a range of from about 40% to about 300% by weight of the aluminum powder. Additional disclosure regarding the use of aluminum powder and retarders for use therewith to produce hydrogen gas can be found in U.S. Pat. No. 4,565,578, which is incorporated by reference herein in its entirety.

An example of a suitable second reactant for reacting with the hydrogen generating material to produce hydrogen is an alkaline aqueous solution. The alkaline aqueous solution may include water and a sufficient amount of an alkaline material to have a pH in the range of from about 10 to about 14. Examples of suitable alkaline materials include, but are not limited to, carbonate, hydroxide, and oxide salts of alkali and alkaline earth metals such as lithium, sodium, magnesium, and calcium, hydraulic cements, and combinations thereof. The activators for hydrogen generating material comprising aluminum powder may be any of the alkaline compositions listed above for activation of the nitrogen generating material, including for example a cement slurry. The alkaline compositions may be added to the plugging composition in amounts such that the plugging composition has a pH in the range of from about 7 to about 14, alternatively from about 10 to about 14, alternatively from about 12 to about 13.

In an embodiment, the first and/or the second reactant may be encapsulated with at least one material for delaying the gas generating reaction. If the reactant is a solid, it can be encapsulated by spray coating a variety of materials thereon, including but not limited to a wax, a drying oil such as tung oil and linseed oil, a polyurethane, a crosslinked partially hydrolyzed polyacrylic, a water degradable compound or polymer, fatty acid esters such as those described as retarders for aluminum powder, or combinations thereof. For example, an undercoat of polymeric materials such as styrene-butadiene may be deposited on the particles of the reactant before depositing another coating. If the reactant comprises an aqueous solution, it may be encapsulated in a particulate porous solid material that remains dry and free flowing after absorbing the aqueous solution and through which the aqueous solution slowly diffuses. Examples of such particulate porous solid materials include but are not limited to diatomaceous earth, zeolites, silica, alumina, metal salts of alumino-silicates, clays, hydrotalcite, styrenedivinylbenzene based materials, cross-linked polyalkylacrylate esters, cross-linked modified starches, and combinations thereof. To delay the reaction even longer, an external coating of a polymeric material through which an aqueous solution slowly diffuses can be placed on the porous solid material. Examples of such polymeric materials include but are not limited to EDPM rubber, polyvinyldichloride, nylon, waxes, polyurethanes, cross-linked partially hydrolyzed acrylics, and combinations thereof. Additional disclosure regarding suitable gas generating materials, activators for use therewith, and coatings for use therewith can be found in U.S. Pat. Nos. 6,722,434, 6,715,553, and 4,450,010 and in currently pending U.S. application Ser. No. 10/159,001, filed on May 31, 2002, each of which is incorporated by reference herein in its entirety. An example of encapsulated aluminum powder is SUPER CBL available from Halliburton Energy Services, Inc.; an example of encapsulated alkaline material is encapsulated sodium bicarbonate (70% active) available from Balchem Corporation, New Hampton, N.Y.; and an example of encapsulated acid is encapsulated citric acid available from Balchem Corp.

The plugging composition may be a material that upon its initial preparation has an effective viscosity to allow it to be pumped into the wellbore and that eventually hardens into a solid mass that is impermeable to fluids. In an embodiment, the plugging composition is a cement composition comprising a fluid and a cement. The cement may be, for example, hydraulic cement composed of calcium, aluminum, silicon, oxygen, and/or sulfur, which sets and hardens by reaction with water. Examples of suitable hydraulic cements are Portland cements (e.g., classes A, C, G, and H Portland cements), pozzolana cements, gypsum cements, phosphate cements, high alumina content cements, silica cements, and high alkalinity cements. Suitable median cement particle sizes are in the 1 to 200 microns range A sufficient amount of fluid is added to the cement to form a pumpable slurry. The fluid may be fresh water or salt water, i.e., an unsaturated aqueous salt solution or a saturated aqueous salt solution such as brine or seawater, or a non-aqueous fluid. When the plugging composition comprises a cement composition, which is an alkaline aqueous solution, the cement composition may serve as the second reactant. In an embodiment, the cement may be added to the plugging composition in amounts such that the plugging composition has a pH in the range of from about 7 to about 14, alternatively from about 10 to about 14, alternatively from about 12 to about 13. In an embodiment, the cement may be present in the plugging composition in amounts of 25% to 70% by weight of the slurry.

When suitable non-aqueous fluids such as diesel and kerosene are used, some surfactants may be used in suitable amounts to assist in the water wetting and hydration of the cement particles upon exposure to water. Examples of suitable surfactant systems include imidazole fally acid condensates and slats of dodecybenzene sulfonic acid. Such suitable surfactants are available from Halliburton Energy Services, Inc. as MOC-One and DOC-3. The cement based plugging compositions may also comprise water swellable clays such as bentonite and other montmorillonite clays. In an embodiment, when the cement composition utilizes a non-aqueous fluid, an aqueous solution may be pumped via a second concentric conduit and allowed to contact the cement composition near or in the permeable zone. The volume of the cement composition and the aqueous solution concentrically pumped is adjusted such that upon contacting, the water to cement ratio is from about 0.3 to about 1.5.

In other embodiments, the plugging composition includes a latex emulsion, oil, a water-in-oil emulsion in which the internal water phase may contain one or more salts, a hydratable polymer, an organophilic clay, a water swellable clay, a dispersant for minerals, surfactant, a salt, a defoamer, or combinations thereof. Components of such plugging compositions may be contacted near or in the permeable zone by pumping as separate fluids through two or more concentric conduits. For example, a first fluid may comprise an aqueous latex emulsion, additional water, an organophilic clay, a particle-suspending aid or a viscosifier, a mineral dispersant, a water wetting surfactant, and a salt. A second fluid may be a oil or a water-in-oil emulsion containing salts such as calcium salts dissolved in the aqueous phase. In an embodiment the water-in-oil emulsion is an oil based drilling fluid. Alternately, the second fluid may be an aqueous fluid containing divalent metal salts.

In another embodiment, the first fluid may be a non-aqueous suspension of a water swellable clay, a hydratable polymer, and an organophilc clay. The second fluid may be a water-based fluid, for example a water based drilling fluid. The plugging composition may further include cross-linking agents, dispersing agents, cement, fillers, and so forth.

When a plugging composition comprising a hydratable polymer contacts water, the hydratable polymer is hydrated and forms a highly viscous gel, and the water swellable clay swells and forms an highly viscous mass. The organophilic clay reacts with the oil to increase the viscosity of plugging composition before it contacts water, thus preventing the polymer and the water swellable clay from settling out of the plugging composition. Examples of suitable oils include but are not limited to diesel oil, mineral oils, kerosene, vegetable oils, synthetic oils, esters, olefins, and combinations thereof. The amount of oil present in the plugging composition may be in a range of from about 32% to about 62% by weight of the composition. Examples of suitable hydratable polymers include but are not limited to polysaccharides and derivatives thereof that contain one or more of the monosaccharide units galactose, mannose, glucoside, glucose, xylose, arabinose, fructose, glucuronic acid, or pyranosyl sulfate, guar gum and derivatives thereof, locust bean gum, tara, konjak, tamarind, starch, cellulose and derivatives thereof, karaya, xanthan, tragacanth, and carrageenan, polyacrylate, polymethacrylate, polyacrylamide, maleic anhydride, methylvinyl ether polymers, polyvinyl alcohol, polyvinylpyrrolidone, and combinations thereof. The amount of hydratable polymer present in the plugging composition may be in a range of from about 3% to about 6% by weight of the composition. The organophilic clay may be, for example, an alkyl quaternary ammonium bentonite clay. The amount of organophilic clay present in the plugging composition may be in a range of from about 0.3% to about 0.6% by weight of the composition. Examples of suitable water swellable clays include but are not limited to montmorillonite, attapulgite, Fuller's earth, bentonite, and combinations thereof. The amount of water swellable clay present in the plugging composition may be in a range of from about 34% to about 62% by weight of the composition. Such plugging compositions are commercially available from Halliburton Energy Services, Inc. under the tradename FLEX-PLUG compositions, which are typically contacted downhole with a drilling fluid being circulated in the wellbore. In an embodiment, a FLEXPLUG composition comprising an activator is contacted with an oil based drilling fluid comprising a gas generating material. In another embodiment, a first fluid comprising latex, an organophilic bentonite known as CLAYTONE II available from Rockwood Specialties, Inc., hydroxylethyl cellulose known as HEC-25 available from Dow, soda ash, a dispersant known as CFR-3, and an activator is contacted with oil based drilling fluid comprising a gas generating material.

In yet another embodiment, the plugging composition includes a swelling agent and a sufficient amount of a carrier fluid to render the compositions pumpable. Examples of suitable carrier fluids with which the swelling agent may be combined include fresh water, brine water of varying salinity, chloride solutions such as calcium dichloride and potassium chloride solutions, hydrocarbons such as produced oil and diesel oil, synthetic fluids such as ester or polymer based fluids, and combinations thereof. In an embodiment, a fluid used to service the wellbore may be employed in the plugging composition. Examples of such fluids include but are not limited to a cement slurry, a drilling fluid, a fracturing fluid, an acidizing fluid, an injectant, and combinations thereof. As used herein, the swelling agent is defined as a material that is capable of absorbing water and that swells, i.e., increases in size, as it absorbs the water. The amount of the swelling agent present in the plugging composition may be in a range of from about 0.001 ppg (pounds per gallon) to about 5 ppg and is preferably about 0.5 ppg. In an embodiment, the swelling agent is insoluble in water and thus avoids becoming diluted and washed away by aqueous fluids flowing through the wellbore. In an embodiment, the swelling agent forms a gel mass upon swelling effective for blocking a flow path of fluid. In an embodiment, the gel mass has a relatively low permeability to fluids used to service a wellbore, thus creating a barrier to the flow of such fluids. A gel is herein defined as a crosslinked polymer network swollen in a liquid. The crosslinker is usually part of the polymer and thus will not absorb out of the polymer.

Suitable swelling agents include superabsorbents, which are commonly used in absorbent products such as moisture retaining horticultural products, diapers, training pants, and feminine care products. Superabsorbents are swellable crosslinked polymers that have the ability to absorb and store many times their own weight of aqueous liquids by forming a gel. The superabsorbents retain the liquid that they absorb and typically do not release the liquid, even under pressure. Examples of superabsorbents include sodium acrylate-based polymers having three dimensional, network-like molecular structures. The polymer chains are formed by the reaction/joining of millions of identical units of acrylic acid monomer, which have been substantially neutralized with sodium hydroxide (caustic soda). Crosslinking chemicals tie the chains together to form a three-dimensional network, enabling the superabsorbents to absorb water or water-based solutions into the spaces in the molecular network, and thus forming a gel and locking up the liquid. Additional examples of suitable swelling agents comprise crosslinked polyacrylamide; crosslinked polyacrylate; crosslinked hydrolyzed polyacrylonitrile; salts of carboxyalkyl starch, for example, salts of carboxymethyl starch; salts of carboxyalkyl cellulose, for example, salts of carboxymethyl cellulose; salts of any crosslinked carboxyalkyl polysaccharide; crosslinked copolymers of acrylamide and acrylate monomers; starch grafted with acrylonitrile and acrylate monomers; crosslinked polymers of two or more of allylsulfonate, 2-acrylamido-2-methyl-1-propanesulfonic acid, 3-allyloxy-2-hydroxy-1-propane-sulfonic acid, acrylamide, and acrylic acid monomers; or combinations thereof.

In an embodiment, the swelling agent is a dehydrated, crystalline (i.e., solid) polymer. In a preferred embodiment, the crystalline polymer is a crosslinked polymer. In a more preferred embodiment, the crosslinked polymer is a crosslinked polyacrylamide in the form of a hard crystal. A suitable crosslinked polyacrylamide is DIAMOND SEAL polymer available from Baroid Drilling Fluids, Inc., a Halliburton Company, Houston, Tex. The DIAMOND SEAL polymer is available in grind sizes of 1 mm, 4 mm, and 14 mm. The DIAMOND SEAL polymer possesses certain qualities that make it an exceptional swelling agent. For example, the DIAMOND SEAL polymer is water-insoluble and is resistant to deterioration by carbon dioxide, bacteria, and subterranean minerals. Further, the DIAMOND SEAL polymer can withstand temperatures up to at least 250° F. without experiencing breakdown and thus may be used in the majority of locations where oil reservoirs are found. An example of a biodegradable starch backbone grafted with acrylonitrile and acrylate is commercially available from Grain Processing Corporation of Muscantine, Iowa under the tradename WATER LOCK. Other suitable swelling agents are described in European Patent No. 0566118, which is incorporated by reference herein.

As mentioned previously, the swelling agent absorbs water and is thus physically attracted to water molecules. In the case where the swelling agent is a crystalline crosslinked polymer, the polymer chain deflects and surrounds the water molecules during water absorption. In effect, the polymer undergoes a change from that of a dehydrated crystal to that of a hydrated gel as it absorbs water. Once fully hydrated, the gel usually exhibits a high resistance to the migration of water due to its polymer chain entanglement and its relatively high viscosity. The gel can plug permeable zones and flow pathways because it can withstand substantial amounts of pressure without being dislodged or extruded.

In an embodiment, the swelling agent has a particle size (i.e., diameter) of greater than or equal to about 1 mm before it absorbs water (i.e., in its solid form). The use of the swelling agent having this larger particle size ensures that the swelling agent is less likely to migrate deep into the subterranean formation before being contacted with an aqueous solution to cause it to swell. The flow pathways in the formation thus can be plugged near the surface of the formation, thus preventing the loss of wellbore servicing fluids into the formation. Further, the larger particle size of the swelling agent allows it to be placed in permeable zones in the wellbore, which are typically greater than about 1 mm in diameter. As the swelling agent undergoes hydration, its physical size increases by about 10 to 400 times its original weight. The resulting size of the swelling agent is thus large enough to plug flow pathways in the formation and permeable zones in the wellbore such that fluids cannot undesirably migrate therethrough. The amount and rate by which the swelling agent increases in size vary depending upon its temperature, its grain size, and the ionic strength of the carrier fluid. The temperature of a well generally increases from top to bottom such that the rate of swelling increases as the swelling agent passes downhole. The rate of swelling also increases as the particle size of the swelling agent decreases and as the ionic strength of the carrier fluid decreases.

In an embodiment, the plugging composition may further include a swell time lengthening additive, which is herein defined as a material that is capable of increasing the swell time of the swelling agent. As used herein, the swell time is defined as the time required for the swelling agent to change from a solid state to a fully hydrated gel. The presence of the swell time lengthening additive in the sealant compositions ensures that there is a sufficient amount of time to place the swelling agent in the flow pathways and/or permeable zones downhole before it swells to a size too large to fit therein. Examples of swell time lengthening additives include an alkali metal metasilicate compound, an alkali metal silicate compound, an alkali metal aluminate, or combinations thereof. In an embodiment, the swell time lengthening additive is sodium silicate, potassium silicate, sodium aluminate, or combinations thereof. In an embodiment, the swell time lengthening additive is used in a fresh water carrier fluid.

The swell time of the swelling agent when used in combination with the swell time lengthening additive and fresh water may be in a range of from about 5 minutes to about 16 hours, alternatively in a range of from about 1 hour to about 16 hours. The amount of gel time lengthening additive present in a sealant composition may be effective to increase a swell time of the swelling agent to greater than or equal to about 1 hour. For example, the amount of sodium silicate present in the plugging composition may be in a range of from about 25% to about 75% by total weight of the sodium silicate and the fresh water combined, alternatively in a range of from about 33% to about 67%, or alternatively about 50%.

In the foregoing embodiments, the plugging composition may further include additional additives as deemed appropriate by those skilled in the art. The different components in the sealant compositions may be combined in any suitable order and blended together before being displaced into a wellbore.

Various methods may be used to delay the reaction between the first and second reactants described above until the plugging composition has been placed in at least one downhole permeable zone. In one embodiment, the first and second reactants may be concurrently pumped into the wellbore via separate flow paths, for example within two concentric conduits, to the permeable zone where they are allowed to contact each other in the presence of the plugging composition. For example, a drill pipe may be disposed within a casing, and one reactant may be pumped through the drill pipe while the other reactant is pumped outside of the drill pipe. The plugging composition may be pumped to the permeable zone ahead of the first and second reactants, or it may be pumped concurrent with those reactants by combining it with one of the reactants before it is displaced into the wellbore.

As described previously, the first reactant, e.g., a gas generating compound such as a nitrogen, carbon dioxide, or hydrogen generating material, may be reactive with an activator such as an alkaline aqueous solutions. If this is the case, the first reactant is preferably prevented from contacting plugging compositions that could contain an activator until it has reached the permeable zone. In an embodiment in which the plugging composition is a cement composition comprising an activator, e.g., an alkaline aqueous solution, the first reactant may be pumped down a different flow path than the cement composition. In this case, the cement composition may serve as the second reactant. In an embodiment in which the plugging composition comprises an oil-based fluid (e.g., the FLEXPLUG composition and oil-based drilling fluid), the first reactant may be combined with the plugging composition at the surface or while it is being pumped into the wellbore such that it passes down the same flow path as the plugging composition. In this case, the second reactant may be pumped down the other flow path. In an embodiment in which the plugging composition comprises a water-based fluid (e.g., the FLEXPLUG composition and a water-based drilling fluid), the first reactant may be pumped down a different flow path than the plugging composition. In this case, the first reactant may be suspended in a non-aqueous carrier fluid such as an oil-based drilling fluid or in a FLEXPLUG W composition commercially available from Halliburton Energy Services, Inc. Also, the second reactant may be pumped down the same flow path as the plugging composition.

In another embodiment, the first reactant, the second reactant, and a retarder for slowing the reaction between the first reactant and the second reactant may be simultaneously pumped to at least one permeable zone. They may be combined with the plugging composition at the surface or as it is being pumped into the wellbore. Alternatively, the plugging composition may be pumped ahead of the reactants and the retarder. The retarder preferably slows the reaction rate between the reactants such that a majority of the gas is generated after the plugging composition is placed in the permeable zone. The aluminum powder/retarder systems described above would be suitable for this application.

In yet another embodiment, one of the reactants may be encapsulated to delay the reaction between the two reactants, allowing the reactants to be concurrently pumped to at least one permeable zone. Due to this delay, the reaction desirably primarily occurs when the reactants and the plugging composition are positioned within the permeable zone such that a majority of the gas is generated therein. The methods described above for encapsulating the one or both of the reactants and thereby delaying the reaction between the gas generating material and the activator would be suitable for this application.

In an embodiment, the first and second reactants are sequentially placed in the permeable zone, for example by pumping the first reactant followed by the second or vice-versa. Care should be taken in such placement to ensure adequate contact between the reactants for in situ generation of the gas.

The generation of the gas in the plugging composition while it is positioned in the wellbore may cause the volume of the plugging composition to increase by, for example, from about 0.1% to about 50% by total volume of the composition when the downhole pressure is in a range of from about 3,000 psi to about 5,000 psi. As such, the plugging composition expands to fill a cross-section of the permeable zone, thus blocking the flow of fluid through the zone. Its outer surface typically forms a bond with the surfaces at the perimeter of the permeable zone. In addition, the presence of the gas in the plugging composition increases the friction between it and adjacent surfaces of the permeable zone. As such, the amount of force required to dislodge the plugging composition containing the gas from the permeable zone is greater than, for example equal to or greater than about 50% greater than, would be required to dislodge the same plugging composition containing no gas. The presence of the gas also improves the resiliency (or elasticity) of the plugging composition after it has set. As used herein, the resiliency refers to the ability of a material to undergo stress, deform, and then recover and return to its original shape after the stress ceases. As a result of its increased resiliency, the plugging composition may expand and contract in response to corresponding expansions and contractions of the permeable zone. It is therefore more likely to remain bonded to the surfaces of the permeable zone despite such expansions and contractions. Moreover, a force may be applied to the plugging composition containing the gas, thereby compressing it, for a longer duration of time without dislodging the composition from the permeable zone as compared to the same plugging composition containing no gas. Consequently, the ability of the plugging composition to seal the permeable zone against the migration of fluid therethrough for a relatively long period of time is improved by the generation of the gas.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

Figure 1:
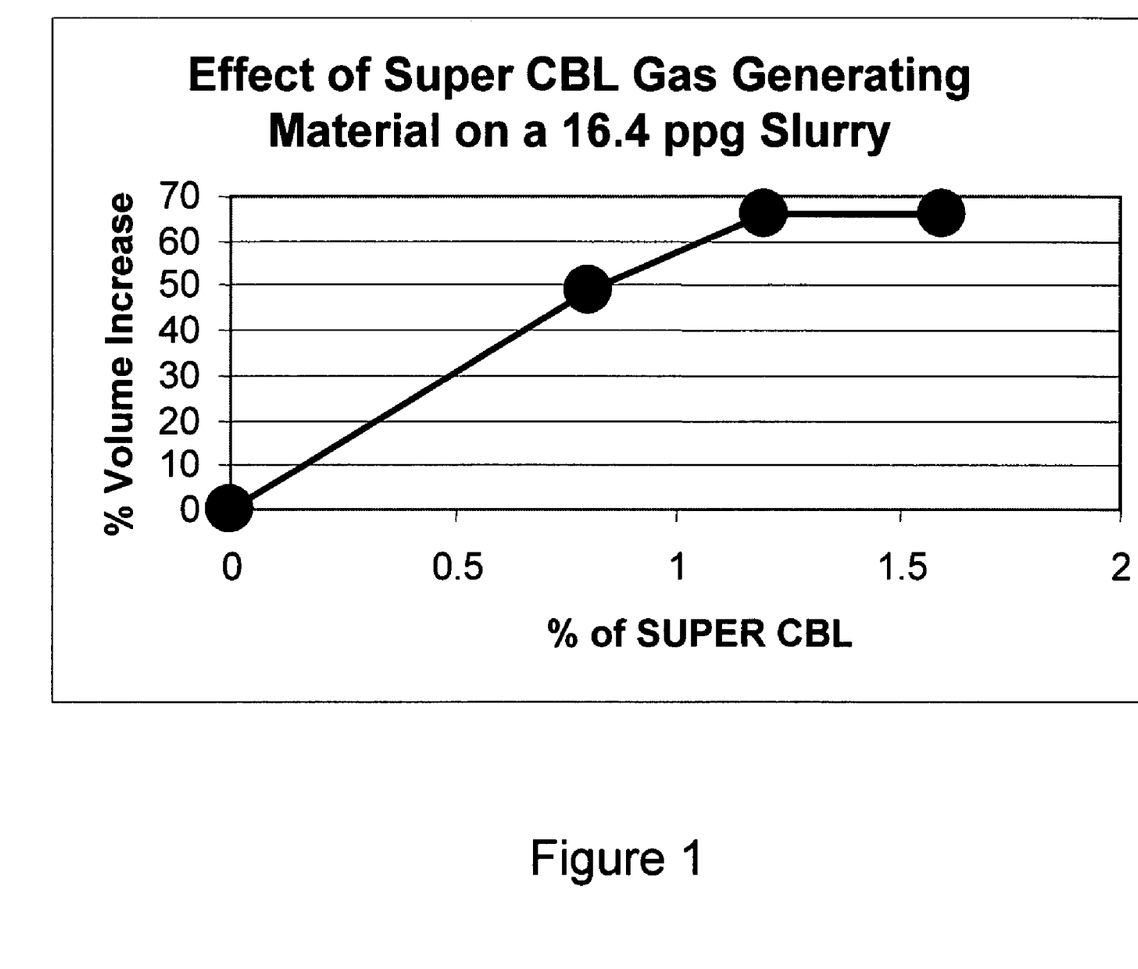
FIG. 1 is a graph plotting the percent volume increase of a cement slurry due to the generation of gas therein as a function of the concentration of SUPER CBL gas generating material in the cement slurry.

Various concentrations of a coated aluminum powder known as SUPER CBL additive available from Halliburton Energy Services, Inc. were added as the gas generating material to different samples of a 16.4 ppg class H cement slurry, thereby generating $H_2$ in each sample. The % volume increase of each sample as a result of the generation of the gas was then determined at a temperature of 75° F. and at atmospheric pressure. Slurries with different amounts of SUPER CBL were allowed to set in cylindrical container at atmospheric pressure and 80° F., and once set the volume of the set material in each case was measured. FIG. 1 is a graph showing the % volume increase of the cement slurry as a function of the concentration of the SUPER CBL gas generating material. As illustrated in FIG. 1, the percentage by which the volume of the slurry increased experienced an increase as the concentration of the SUPER CBL gas generating material was increased from about 0% to about 1.2%, and then it leveled off at about 67%.

Example 2

Figure 2:
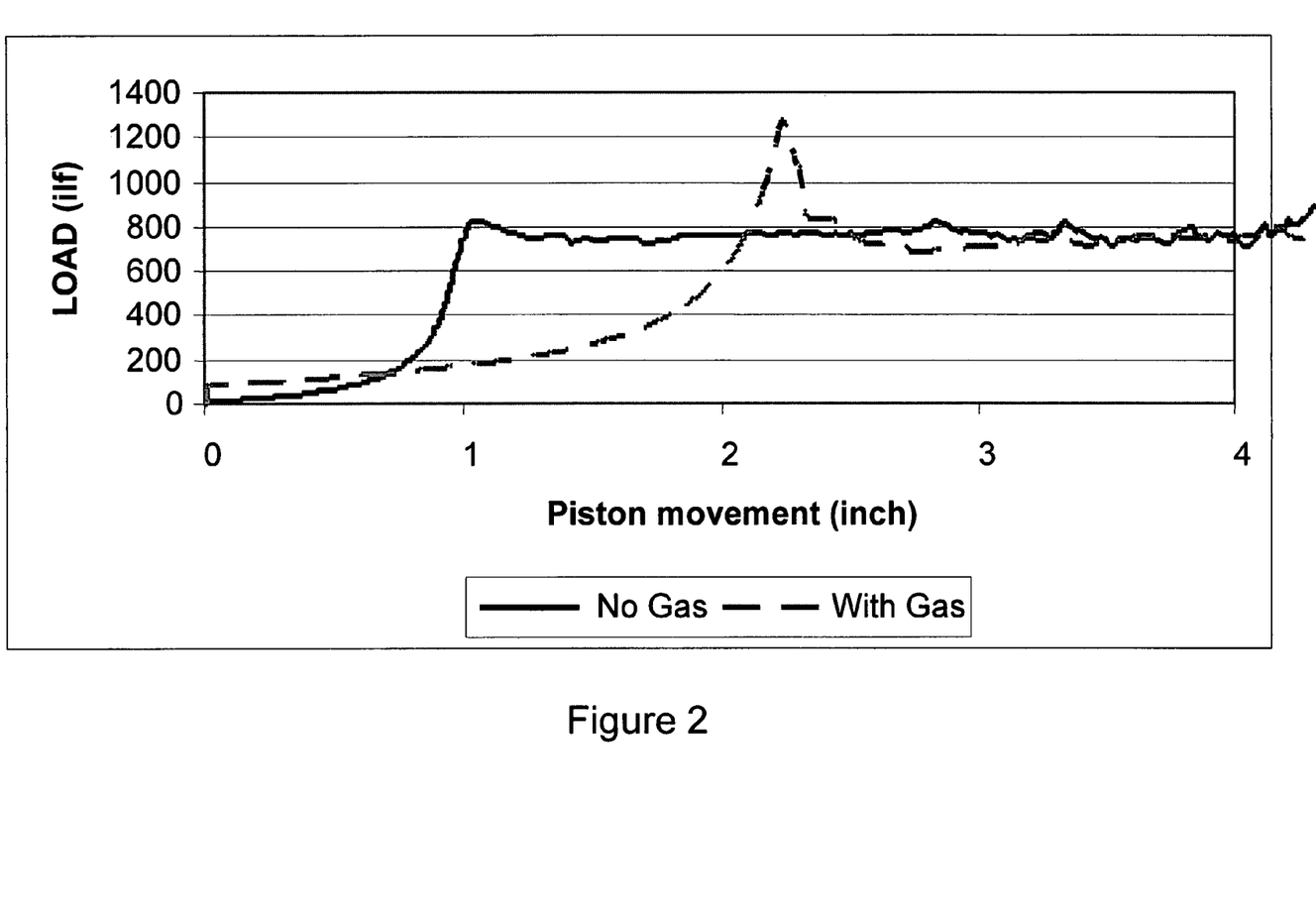
FIG. 2 is a graph plotting the load as a function of piston movement for FLEXPLUG plugging compositions with and without gas, wherein the plugging compositions are pushed through and out of a fracture using a piston.

A FLEXPLUG composition containing gas generated using SUPER CBL was placed in an L-shaped tube having a fracture at its base. A piston in the tube was used to apply an increasing load (i.e., force) to the top of the FLEXPLUG composition, thereby forcing it into and through the fracture. This procedure was repeated for a FLEXPLUG composition containing no gas. FIG. 2 is a graph of the load as a function of the piston movement for each FLEXPLUG composition. The peaks in FIG. 2 represent the when the FLEXPLUG compositions were extruded into the fracture. As illustrated by FIG. 2 and Table 1 below, the load required to extrude the FLEXPLUG composition containing gas was greater than that required to extrude the FLEXPLUG composition containing no gas. Thus, the composition containing gas exhibited greater friction relative to adjacent surfaces of the tube than the composition containing no gas. Further, the distance and therefore duration of piston movement required to extrude the FLEXPLUG composition containing the gas was greater than that required to extrude the FLEXPLUG composition containing no gas. As such, the resiliency of the FLEXPLUG composition containing the gas was greater than that containing no gas.

TABLE 1

| Force needed for extrusion | FLEXPLUG system |
| --- | --- |
| 823 lbf | No Gas |
| 1277 lbf | With Gas |
| Movement of the piston | FLEXPLUG system |
| 1.06 inch | No Gas |
| 2.24 inch | With Gas |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore, comprising:
   circulating a drilling fluid in the wellbore;
   upon loss of circulation of the drilling fluid, introducing a plugging composition into the wellbore;
   allowing the plugging composition to flow into a permeable zone in the wellbore; and
   generating a gas in the plugging composition in situ within the permeable zone; wherein said generating the gas comprises introducing a first reactant and a second reactant to the plugging composition, and wherein the volume of the plugging composition increases by from about 0.1% to about 50% by total volume of the composition at a pressure of from about 3,000 psi to about 5,000 psi.

2. The method of claim 1, wherein the gas is generated via a chemical reaction.

3. The method of claim 1, wherein the first reactant comprises a nitrogen generating material comprising hydrazine, a hydrazine salt of an acid, azodicarbonamide, azobis(isobutyronitrile), p-toluene sulfonyl hydrazide, p-toluene sulfonyl semicarbazide, carbohydrazide, p-p'-oxybis(benzenesulfonylhydrazide), an ammonium salt of an organic or inorganic acid, hydroxylamine sulfate, carbamide, or combinations thereof.

4. The method of claim 1, wherein the second reactant comprises an alkaline aqueous solution.

5. The method of claim 1, wherein the second reactant comprises an oxidizing agent.

6. The method of claim 1, wherein the first reactant comprises a hydrogen generating material comprising aluminum, calcium, zinc, magnesium, lithium, sodium, potassium, or combinations thereof.

7. The method of claim 6, wherein the second reactant comprises an alkaline aqueous solution.

8. The method of claim 1, wherein the first reactant comprises a carbon dioxide generating material comprising ammonium, alkali metal, alkaline earth metal and transition metal salts of carbonate and bicarbonate, or combinations thereof.

9. The method of claim 8, wherein the second reactant comprises an acid or acid generating material.

10. The method of claim 8, wherein the second reactant comprises acetic acid; citric acid; tartaric acid; alkali, alkaline earth and transition metal salts of dihydrogen phosphate, acid pyrophosphate; or combinations thereof.

11. The method of claim 1, wherein the first and second reactants are concurrently pumped into the wellbore via separate flow paths within two concentric conduits to the permeable zone where they are allowed to contact each other in the presence of the plugging composition.

12. The method of claim 11, wherein the plugging composition is pumped to the permeable zone ahead of the first and second reactants.

13. The method of claim 11, wherein the plugging composition is pumped to the permeable zone concurrent with pumping the first and second reactants.

14. The method of claim 1, wherein the plugging composition comprises a cement composition that also serves as the second reactant.

15. The method of claim 1, wherein the first reactant comprises an aluminum powder.

16. The method of claim 1, wherein the first reactant and the second reactant are concurrently pumped to the permeable zone, and wherein the first reactant, the second reactant, or both are encapsulated to delay a reaction between the first reactant and the second reactant.

17. The method of claim 16, wherein the first reactant comprises a nitrogen generating compound.

18. The method of claim 16, wherein the second reactant comprises an alkali or alkaline earth metal salt of a peroxide, persulfate, perborate, hypochlorite, hypobromite, chlorite, chlorate, iodate, bromate, chloroaurate, arsenate, antimonite, or molybate anion, or combinations thereof.

19. The method of claim 16, wherein the second reactant comprises a solid encapsulated in a coating material comprising a wax, a drying oil, a polyurethane, a crosslinked partially hydrolyzed polyacrylic, or combinations thereof.

20. The method of claim 16, wherein the second reactant comprises an aqueous solution encapsulated in a porous solid material through which the aqueous solution is capable of diffusing.

21. The method of claim 1, wherein the plugging composition comprises a cement composition.

22. The method of claim 1, wherein the plugging composition comprises an oil, a hydratable polymer, an organophilic clay, and a water-swellable clay.

23. The method of claim 1, wherein the plugging composition comprises an activator and a drilling fluid comprises a gas-generating material.

24. The method of claim 23, wherein the plugging composition comprises latex, organophilic bentonite, hydroxyethyl cellulose, soda ash, a dispersant, and the activator.

25. The method of claim 1, wherein the plugging composition comprises a crosslinked polymer having a diameter greater than or equal to about 1 mm in size.

26. The method of claim 25, wherein the crosslinked polymer comprises crosslinked polyacrylamide.

27. The method of claim 1, wherein the plugging composition comprises a crosslinked polyacrylamide; crosslinked polyacrylate; crosslinked hydrolyzed polyacrylonitrile; salts of carboxyalkyl starch, for example, salts of carboxymethyl starch; salts of carboxyalkyl cellulose, for example, salts of carboxymethyl cellulose; salts of any crosslinked carboxyalkyl polysaccharide; crosslinked copolymers of acrylamide and acrylate monomers; starch grafted with acrylonitrile and acrylate monomers; crosslinked polymers of two or more of allylsulfonate, 2-acrylamido-2-methyl-1-propanesulfonic acid, 3-allyloxy-2-hydroxy-1-propane-sulfonic acid, acrylamide, and acrylic acid monomers; or combinations thereof.

28. The method of claim 27, wherein the plugging composition comprises an alkali metal metasilicate compound, an alkali metal silicate compound, an alkali metal aluminate, or combinations thereof.

29. The method of claim 27, wherein the plugging composition comprises sodium silicate.

30. The method of claim 1, wherein the permeable zone is in a subterranean formation penetrated by the wellbore, a wall of a conduit disposed in the wellbore, a column disposed in the wellbore, a microannulus in the wellbore, or combinations thereof.

31. The method of claim 1, wherein the permeable zone comprises a fissure, a crack, a fracture, a vug, a streak, a flow channel, a void, a perforation, or combinations thereof.

32. The method of claim 1, wherein the gas is generated by gasifying a liquefied gas included in the plugging composition.

33. The method of claim 1, wherein the first reactant and the second reactant are capable of reacting at ambient temperatures in the wellbore to produce the gas.

34. The method of claim 1, wherein the first reactant, the second reactant, and a retarder for delaying a reaction between the first reactant and the second reactant are concurrently pumped to the permeable zone.

35. The method of claim 34, wherein the retarder comprises sorbitan monooleate, glycerol monoricinoleate, sorbitan monoricinoleate, sorbitan monotallate, pentaerythritol monoricinoleate, sorbitan monoisostearate, glycerol monostearate, sorbitan monostearate, or combinations thereof.

36. A method of servicing a wellbore, comprising:
circulating a drilling fluid within the wellbore;
upon loss of circulation of the drilling fluid introducing a plugging composition to the wellbore;
allowing the plugging composition to flow into a permeable zone in the wellbore; and
generating a gas in a plugging composition in situ within the permeable zone; wherein said generating the gas comprises introducing a first reactant and a second reactant to the plugging composition; wherein the first reactant, the second reactant, or both are encapsulated with at least one material for delaying the gas generating reaction and wherein the material is selected from the group consisting of a drying oil, a polyurethane, a crosslinked partially hydrolyzed polyacrylic, a water degradable compound or polymer, diatomaceous earth, zeolites, silica, alumina, metal salts of alumino-silicates, clays, hydrotalcite, styrenedivinylbenzene based materials, cross-linked polyalkylacrylate esters, cross-linked modified starches, EDPM rubber, polyvinyldichloride, nylon, polyurethanes, and combinations thereof, and wherein the volume of the plugging composition increases by from about 0.1% to about 50% by total volume of the composition at a pressure of from about 3,000 psi to about 5,000 psi.

37. A method of improving a plugging composition, comprising:
circulating a drilling fluid within the wellbore;
upon loss of circulation of the drilling fluid introducing a plugging composition to the wellbore;
allowing the plugging composition to flow into a permeable zone in the wellbore and generating gas in the plugging composition in situ within the permeable zone to increase friction between the plugging composition and an adjacent surface in a wellbore upon a loss of circulation in the wellbore; and wherein said generating the gas comprises introducing a first reactant and a second reactant to the plugging composition; and wherein the volume of the plugging composition increases by from about 0.1% to about 50% by total volume of the composition at a pressure of from about 3,000 psi to about 5,000 psi.

38. The method of claim 37, wherein the generation of the gas increases a resiliency of the plugging composition.

39. The method of claim 37, wherein the permeable zone is in a subterranean formation penetrated by the wellbore, a wall of a conduit disposed in the wellbore, a column disposed in the wellbore, a microannulus in the wellbore, or combinations thereof.

40. The method of claim 37, wherein the permeable zone comprises a fracture, a fissure, a crack, a vug, a streak, a flow channel, a void, or combinations thereof.

41. The method of claim 37, wherein an amount of force required to dislodge the plugging composition from the permeable zone after the gas is generated is greater than an amount of force required to dislodge the same plugging composition before the gas is generated.

42. The method of claim 37, wherein the plugging composition remains in the permeable zone for a longer duration of time when a force is applied to it after the gas is generated than before the gas is generated.

43. A method of servicing a wellbore, comprising:
circulating a drilling fluid within the wellbore;
upon loss of circulation of the drilling fluid introducing a plugging composition to the wellbore;
allowing the plugging composition to flow into a permeable zone in the wellbore and generating a gas in a plugging composition in situ within the permeable zone, wherein the plugging composition expands to fill a cross-section of the permeable zone, thus blocking the flow of fluid through the zone and wherein the permeable zone is a loss circulation zone, wherein the volume of the plugging composition increases by from about 0.1% to about 50% by total volume of the composition at a pressure of from about 3,000 psi to about 5,000 psi.

44. The method of claim 36, wherein the plugging composition comprises a crosslinked polyacrylamide; crosslinked polyacrylate; crosslinked hydrolyzed polyacrylonitrile; salts of carboxyalkyl starch, for example, salts of carboxymethyl starch; salts of carboxyalkyl cellulose, for example, salts of carboxymethyl cellulose; salts of any crosslinked carboxyalkyl polysaccharide; crosslinked copolymers of acrylamide and acrylate monomers; starch grafted with acrylonitrile and acrylate monomers; crosslinked polymers of two or more of allylsulfonate, 2-acrylamido-2-methyl-1-propanesulfonic acid, 3-allyloxy-2-hydroxy-1-propane-sulfonic acid, acrylamide, and acrylic acid monomers; or combinations thereof.

* * * * *

UNITED STATES PATENT AND TRADEMARK OFFICE
CERTIFICATE OF CORRECTION

PATENT NO. : 7,642,223 B2  
APPLICATION NO. : 10/967121  
DATED : January 5, 2010  
INVENTOR(S) : Santra et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 593 days.

Signed and Sealed this

Sixteenth Day of November, 2010

David J. Kappos  
*Director of the United States Patent and Trademark Office*